US006047099A

United States Patent [19]
Oku

[11] Patent Number: 6,047,099
[45] Date of Patent: Apr. 4, 2000

[54] VIDEO RECORDING AND REPRODUCING DEVICE

[75] Inventor: Kiyoharu Oku, Osaka, Japan

[73] Assignee: Matsushita Electric Industrial Co., Ltd., Osaka, Japan

[21] Appl. No.: 08/834,740

[22] Filed: Apr. 3, 1997

[30] Foreign Application Priority Data

Apr. 12, 1996 [JP] Japan .................................. 8-090958

[51] Int. Cl.⁷ .................................................. H04N 5/93
[52] U.S. Cl. ................................ 386/52; 386/46; 386/102
[58] Field of Search .................................. 386/4, 46, 52, 386/54, 66, 96, 117–118, 102; 348/787, 789, 794, 825, 836, 840, 722; 360/13; 358/906, 909.1; H04N 5/93

[56] References Cited

U.S. PATENT DOCUMENTS

| | | | |
|---|---|---|---|
| 4,011,404 | 3/1977 | Graham ..................................... | 358/158 |
| 4,283,745 | 8/1981 | Kuper et al. ............................... | 360/13 |
| 4,357,624 | 11/1982 | Greenberg .................................. | 386/4 |
| 4,528,600 | 7/1985 | Ishiguro et al. ........................ | 360/14.4 |
| 4,746,994 | 5/1988 | Ettinger ..................................... | 360/13 |
| 4,750,050 | 6/1988 | Belmares-Sarabia et al. ............. | 386/4 |
| 5,177,618 | 1/1993 | Dunlap et al. ........................... | 358/335 |
| 5,477,337 | 12/1995 | Schuler ..................................... | 386/52 |

FOREIGN PATENT DOCUMENTS

| | | |
|---|---|---|
| 58-80112 | 5/1983 | Japan . |
| 3173985 | 7/1991 | Japan . |
| 6295567 | 10/1994 | Japan . |
| 7336170 | 12/1995 | Japan . |

OTHER PUBLICATIONS

Herbert M. Honig, A Stereo Comatibility Translator, Audio, pp. 24–25 and 95, Aug. 1958.
Japanese Office Action dated Feb. 2, 1999, Dispatch No. 019005, Patent Appln. No. 8–090958 dated Jan. 25, 1999, with English translation.

Primary Examiner—Wendy Garber
Assistant Examiner—Vincent F. Boccio
Attorney, Agent, or Firm—Stevens, Davis, Miller & Mosher, L.L.P.

[57] ABSTRACT

In order to easily conduct channel switching and inter-channel mixing at the time of editorial operation without connecting an external device for channel switching or inter-channel mixing, the lap top type video recording and reproducing device includes two built-in audio two channel type video tape recorders, a built-in editorial means for editing between the two video tape recorders, and two audio monitors in one body. The device further includes, a signal selecting circuit for selecting either of a first state where the two channel audio signals reproduced by the video tape recorder are outputted from the same channels, a second state where the reproduced two channel audio signals are outputted from the opposite channels after channel switching, and a third state where the reproduced two channel audio signals are mixed to output the same signals from the both channels, and an input switching circuit for supplying output signals from the signal selecting circuit to the video tape recorder in place of two channel audio input signals inputted from the outside.

8 Claims, 9 Drawing Sheets

VIDEO RECORDING AND REPRODUCING DEVICE

BACKGROUND OF THE INVENTION

1. Field of the Invention

The present invention relates to a lap top video recording and reproducing device, which includes two digital format video tape recorders and two video monitors with a video editing function.

2. Description of the Prior Arts

An overview of a conventional video shooting and editing system will be provided with reference to FIG. 8. In the video shooting and editing system, videos are recorded as follows. For example, at a location site outside a studio, video and audio signals shot with a portable digital camera recorder 101 are recorded in a digital cassette tape (not illustrated), or video and audio signals shot with aportable digital process camera 102 are recorded in a digital cassette tape (not illustrated) with a digital portable video tape recorder 103, which is connected to the digital process camera 102 with a cable 104.

On the other hand, in a studio, video and audio signals shot with a digital process studio camera 105 are recorded in a digital cassette tape (not illustrated) with a digital studio video tape recorder 106, which is connected to the digital process studio camera 105.

Further, videos are edited as follows. Two digital studio video tape recorders 106, 108 are connected to an editorial controller 109 with cables 113, 114, respectively. Then the digital studio video tape recorders 106, 108 are connected to video monitors 110, 111 with cables 115, 116, respectively. A prerecorded original digital cassette tape 112 ejected from the digital camera recorder 101 or the digital portable video tape recorder 103 is placed in the digital studio video tape recorder 108, and a raw digital cassette tape for recording or a master digital cassette tape having prerecorded video information (not illustrated) is loaded in the digital studio video tape recorder 106. The video and audio signals recorded in the digital cassette tape 112 are reproduced with the digital studio video tape recorder 108 and recorded in the digital cassette tape (not illustrated) loaded in the digital studio video tape recorder 106. At the time, assembly editing or insertion editing is conducted by the operation of the editorial controller 109 while the video information shown on the video monitors 110, 111 and displays on indicators of the digital studio video tape recorders 106, 108 and the editorial controller 109 are observed.

In a video shooting and editing system shown in FIG. 8, for editing a video, the digital studio video tape recorders 106, 108, the two video monitors 110, 111 and the editorial controller 109 are prepared. After connecting the units with the cables 113, 114, 115, 116, the editorial operation is conducted by an editor while observing video information on the video monitors 110, 111, and editing related information such as a tape traveling state or a time code on the indicators of the digital studio video tape recorders 106, 108 or the editorial controller 109.

However, since all of the two digital studio video tape recorders 106, 108, the two video monitors 110, 111 and the editorial controller 109 are large, the two digital studio video tape recorders 106, 108 and the editorial controller 109 are arranged separately on a desk of the editor, and the two video monitors 110, 111 are arranged at a position away from the desk of the editor. Therefore, in order to look at both the video information on the video monitors 110, 111 and the editing related information such as the tape traveling state or the time code on the indicators of the digital studio video tape recorders 106, 108 or the editorial controller 109, considerable eye movements of the editor are required. As a result, there will be a time lag between the observation of the video information and the observation of the editing related information, which generates problems of deteriorating editorial accuracy or worsening editorial efficiency by consuming too much time on the editorial operation.

Besides, since the digital studio video tape recorders 106, 108, the video monitors 110, 111 and the editorial controller 109 for video editing are independent to each other, troublesome operation of connecting with the cables 113, 114, 115, 116 is required. Furthermore, since the digital studio video tape recorders 106, 108, the video monitors 110, 111 and the editorial controller 109 are expensive, cost in preparing an editorial equipment is extremely expensive. Moreover, since each unit is independent and large, it is very difficult to carry all the units and shooting units to a location site outside a studio.

In order to solve the problems of such editorial system, a lap top type video recording and reproducing device having integrated two digital video tape recorders and two video monitors comprising liquid crystal panels, and a built-in editorial means is proposed.

Usage of the lap top type video recording and reproducing device in editing will be explained with reference to FIG. 9.

A lap top type video recording and reproducing device 200 comprises a base portion 210 and a movable portion 220 attached to the base portion 210 capable of being upright or prone. The base portion 210 has a two-stage structure with a lower portion at the outer end and a higher portion at the inner end. The higher portion at the inner end comprises a built-in front loading type digital video tape recorder 211 dedicated to reproduction and a built-in front loading type digital video tape recorder 212 for recording and reproduction, arranged horizontally adjacent to each other. The upper surface of the lower portion at the outer end comprises operating portions 213, 214 for the two digital video tape recorders 211, 212 arranged horizontally and an editorial operating portion 215 between the operating portions 213, 214. In this case, the digital video tape recorder 211 is used for reproducing an original tape, and the digital video tape recorder 212 is used for recording a mater tape.

The movable portion 220, where two video monitors 221, 222 comprising color liquid crystal panels are arranged on the surface of the front portion in the upright state, is attached to the base portion 210 rotatably with respect to the vertical direction and is superimposed on the lower portion at the outer end of the base portion in the prone state. The above-mentioned video monitors 221, 222 indicate editing related information such as a tape traveling state and a time code with video information reproduced by the digital video tape recorders 211, 212.

In the lap top type video recording and reproducing device 200, to the two digital video tape recorders 211, 212, a DVC cassette 231 can be loaded directly, and a mini DV cassette 232 can be loaded by the use of a cassette adapter 233.

Hereinafter the recording and reproducing operation is explained. The digital video tape recorder 211 is dedicated for reproduction, and thus can reproduce and output video and audio signals recorded in a digital cassette tape. The digital video tape recorder 212 is capable of recording and reproducing, and thus can record the video and audio signals reproduced by the digital video tape recorder 211 or externally inputted video and audio signals selectively, and further, can reproduce and output the video and audio signals recorded in a digital cassette tape. Editing operation is conducted while video and audio signals reproduced by the digital video tape recorder 211 are recorded by the digital video tape recorder 212.

Hereinafter the editing operation is explained. For example, a DVC cassette 231 where video and audio signals shot with a DVCPRO camera recorder 234 are recorded is loaded in the digital video tape recorder 211 dedicated for reproduction of the video recording and reproducing device 200, or a mini DV cassette 232 where video and audio signals shot with a DV camera recorder 235 are recorded is loaded with a cassette adapter 233 attached in the digital video tape recorder 211 of the video recording and reproducing device 200. A raw or prerecorded master DVC cassette (not illustrated) is loaded to the digital video tape recorder 212 capable of recording and reproducing of the video recording and reproducing device 200.

Video and audio signals recorded in the DVC cassette 231 of the mini DV cassette 232 are reproduced by the digital video tape recorder 211 and recorded in the DVC cassette (not illustrated) loaded in the digital video tape recorder 212, while assembly editing or insertion editing is conducted by operating the operating portions 212, 214 of the digital video tape recorders 211, 212 and the editorial operating portion 215 with the video information and the editing related information indicated on the video monitors 221, 222 are observed.

A video editing system using the video recording and reproducing device 200 as illustrated in FIG. 9 has a structure where the digital video tape recorder 211 dedicated for reproducing an original tape, the digital video tape recorder 212 for recording a master tape and an editing means, necessary for editing are integrated and stored in one body, and thus it is inexpensive, compact and portable. Accordingly, unlike the conventional system illustrated in FIG. 8, there is no need to prepare two independent digital video tape recorders, two video monitors, and an editorial controller, or to bother with connecting the units with cables, but only with one video recording and reproducing device 200, editorial operation can be conducted by an editor. Besides, it can be easily carried to a location site outside a studio with the other shooting equipment.

Furthermore, in editorial operation while video information on the video monitors 221, 222 and editing related information such as a tape traveling state and a time code indicated with the video information are observed, since the video information and the editing related information are indicated on the same screen, the editor can see the video information and the editing related information without significant move of the eyes, and thus there is no time lag between the observation of the video information and the observation of the editing related information.

In the above-mentioned video recording and reproducing device, the digital video tape recorder 212, which is capable of recording and reproducing, can selectively record video and audio signals reproduced by the digital video tape recorder 211 or externally inputted video and audio signals inputted through an audio circuit, and further, can reproduce and output video and audio signals recorded in a digital cassette tape. However, since the two channels of the audio signals are fixed, when two channel audio signals reproduced by the digital video tape recorder 211 are recorded in the digital video tape recorder 212, the audio signals on the first channel are merely recorded on the first channel, and the audio signals on the second channel are merely recorded on the second channel. Therefore, channel switching or inter-channel mixing cannot be conducted only with the video recording and reproducing device, but other external equipment such as a mixer needs to be connected thereto.

For example, in the case surrounding sounds should be recorded on the first channel, and a report should be recorded on the second channel of the audio channels, but a report was recorded on the first channel and surrounding sounds were recorded on the second channel inadvertently at the time of recording the original tape, the audio channels need to be switched for correction in the editorial operation. In such a case, channel switching is required.

Furthermore, in the case of producing a master tape used with a digital video tape recorder having only one channel for audio signals, surrounding sounds on the first channel and a report on the second channel need to be mixed in the editorial operation for recording the same signals on both the first channel and the second channel so that the tape can be applied regardless of whether the channel of the audio signals of the digital video tape recorder having only one channel for audio signals is only the first channel or only the second channel.

Besides, as to reproduction and output of audio signals, there has been a request for channel switching or inter-channel mixing, but it could not be implemented without an external mixing device.

SUMMARY OF THE INVENTION

An object of the present invention is to provide a video recording and reproducing device capable of easily conducting channel switching and inter-channel mixing at the time of editorial operation without connecting an external device for channel switching or inter-channel mixing.

Another object of the present invention is to provide a video recording and reproducing device capable of easily conducting channel switching and inter-channel mixing at the time of reproduction and output without connecting an external device for channel switching or inter-channel mixing.

A first configuration of the video recording and reproducing device comprises built-in audio two channel type first and second video tape recorders for recording two channel audio signals inputted from the outside, a built-in editorial means for editing between the first and second video tape recorders in one body, wherein a first signal selecting circuit for selecting one of a first state where the two channel audio signals reproduced by the first video tape recorder are outputted from the same channels, a second state where the reproduced two channel audio signals are outputted from the opposite channels after channel switching, and a third state where the reproduced two channel audio signals are mixed to output the same signals from the both channels, and an input switching circuit for supplying output signals from the first signal selecting circuit to the second video tape recorder in place of two channel audio input signals inputted from the outside are provided.

According to this configuration, when the input switching circuit is switched to the state where output signals from the first signal selecting circuit are supplied to the second video tape recorder, by selecting the state of the first signal selecting circuit, two channel audio signals reproduced by the first video tape recorder can be recorded by the second video tape recorder on the same channels, or two channel audio signals reproduced by the first video tape recorder can be recorded by the second video tape recorder on the opposite channels after channel switching, and further, two channel audio signals reproduced by the first video tape recorder can be mixed and recorded by the second video tape recorder on the both channels as the same signals. As a consequence, channel switching or inter-channel mixing can be easily conducted without connecting an external device for channel switching or inter-channel mixing.

In the state where two channel audio input signals from the outside are supplied to the second video tape recorder, the two channel audio input signals from the outside can be recorded by the second video tape recorder.

A second configuration of the video recording and reproducing device comprises the first configuration of the video recording and reproducing device wherein a second signal selecting circuit for selecting one of a first state where the two channel audio signals reproduced by the first video tape recorder are outputted from the same channels, a second state where the reproduced two channel audio signals are outputted from the opposite channels after channel switching, and a third state where the reproduced two channel audio signals are mixed to output the same signals from the both channels is provided.

According to this configuration, by selecting the state of the second signal selecting circuit, two channel audio signals reproduced by the second video tape recorder can be outputted on the same channels, or two channel audio signals reproduced by the second video tape recorder can be outputted on the opposite channels after channel switching, and further, two channel audio signals reproduced by the second video tape recorder can be mixed and outputted on the both channels as the same signals. As a consequence, channel switching or inter-channel mixing can be easily conducted without connecting an external device for channel switching or inter-channel mixing.

A third configuration of the video recording and reproducing device comprises built-in audio two channel type first and second video tape recorders for recording two channel audio signals inputted from the outside, and a built-in editorial means for editing between the first and second video tape recorders in one body.

The first video tape recorder comprises a first audio input circuit for inputting two channel audio signals from the outside, a first recording amplifying circuit for amplifying the two channel audio signals outputted from the first audio input circuit, a first recording and reproducing head for recording the output from the first recording amplifying circuit on a first recording medium and reproducing the two channel audio signals recorded on the first recording medium, a first reproducing amplifying circuit for amplifying the two channel audio signals reproduced by the first recording and reproducing head, and a first output circuit for outputting the two channel audio signals reproduced by the first reproducing amplifying circuit to the outside.

The second video tape recorder comprises a second audio input circuit for inputting two channel audio signals from the outside, a second recording amplifying circuit for amplifying the two channel audio signals outputted from the second audio input circuit, a second recording and reproducing head for recording the output from the second recording amplifying circuit on a second recording medium and reproducing the two channel audio signals recorded on the second recording medium, a second reproducing amplifying circuit for amplifying the two channel audio signals reproduced by the second recording and reproducing head, and a second output circuit for outputting the two channel audio signals reproduced by the second reproducing amplifying circuit to the outside.

And the video recording and reproducing device comprises a first signal selecting circuit for selecting one of a first state where the two channel audio signals outputted from the first reproducing amplifying circuit are outputted from the same channels, a second state where the two channel audio signals outputted from the first reproducing amplifying circuit are outputted from the opposite channels after channel switching, and a third state where the two channel audio signals outputted from the first reproducing amplifying circuit are mixed to output the same signals from the both channels, and an input switching circuit for supplying output signals from the first signal selecting circuit to the second recording amplifying circuit in place of two channel audio signals outputted from the second audio input circuit.

According to this configuration, when the input switching circuit is switched to the state where two channel audio signals outputted from the first signal selecting circuit are supplied to the second recording circuit of the second video tape recorder, by selecting the state of the first signal selecting circuit, two channel audio signals reproduced by the first reproducing amplifying circuit of the first video tape recorder can be recorded by the second recording amplifying circuit and the recording and reproducing head of the second video tape recorder on the same channels, or two channel audio signals reproduced by the first reproducing amplifying circuit of the first video tape recorder can be recorded by the second recording amplifying circuit and the recording and reproducing head of the second video tape recorder on the opposite channels after channel switching, and further, two channel audio signals reproduced by the first video tape recorder can be mixed and recorded by the second recording amplifying circuit and the recording and reproducing head of the second video tape recorder on the both channels as the same signals. As a consequence, channel switching or inter-channel mixing can be easily conducted without connecting an external device for channel switching or inter-channel mixing.

In the state where two channel audio input signals from the outside are supplied to the second recording amplifying circuit of the second video tape recorder through the second audio input circuit, the two channel audio input signals from the outside can be recorded by the second recording amplifying circuit and the recording and reproducing head of the second video tape recorder.

A fourth configuration of the video recording and reproducing device comprises the third configuration of the video recording and reproducing device wherein a second signal selecting circuit for selecting one of a first state where the two channel audio signals outputted from the second reproducing amplifying circuit are supplied to the second output circuit on the same channels, a second state where the two channel audio signals outputted from the second reproducing amplifying circuit are supplied to the second output circuit on the opposite channels after channel switching, and a third state where the two channel audio signals outputted from the second reproducing amplifying circuit are mixed and supplied to the second output circuit on the both channels as the same signals is provided between the second reproducing amplifying circuit and the second output circuit.

According to this configuration, by selecting the state of the second signal selecting circuit, two channel audio signals reproduced by the second reproducing amplifying circuit can be outputted to the outside on the same channels through the second output circuit, or two channel audio signals reproduced by the second reproducing amplifying circuit can be outputted to the outside on the opposite channels after channel switching through the second output circuit, and further, two channel audio signals reproduced by the second reproducing amplifying circuit can be mixed and outputted to the outside on the both channels as the same signals through the second output circuit. As a consequence, channel switching or inter-channel mixing can be easily conducted at the time of reproducing and outputting without connecting an external device for channel switching or inter-channel mixing.

A fifth configuration of the video recording and reproducing device comprises any of the first to fourth video recording and reproducing devices, wherein the first and second video monitors for indicating the video outputs from the first and second video tape recorders individually, which are arranged in the same direction, are provided integrally with the body, and the first and second audio monitors for reproducing audio outputs from the first and second video tape recorders are stored in the body.

According to this configuration, since connection with an outside video monitor or an outside audio monitor is not necessary in the editorial operation such as channel switching and mixing of the first channel audio signals and the second channel audio signals, editing can be conducted easily. Further, since the first and second video monitors and the first and second audio monitors are provided, editorial operation with channel switching or inter-channel mixing of audio signals can be conducted after shooting at the location site without returning to the studio, and thus the video and audio signals can be provided for broadcast rapidly.

DESCRIPTION OF THE PREFERRED EMBODIMENTS

Figure 1:
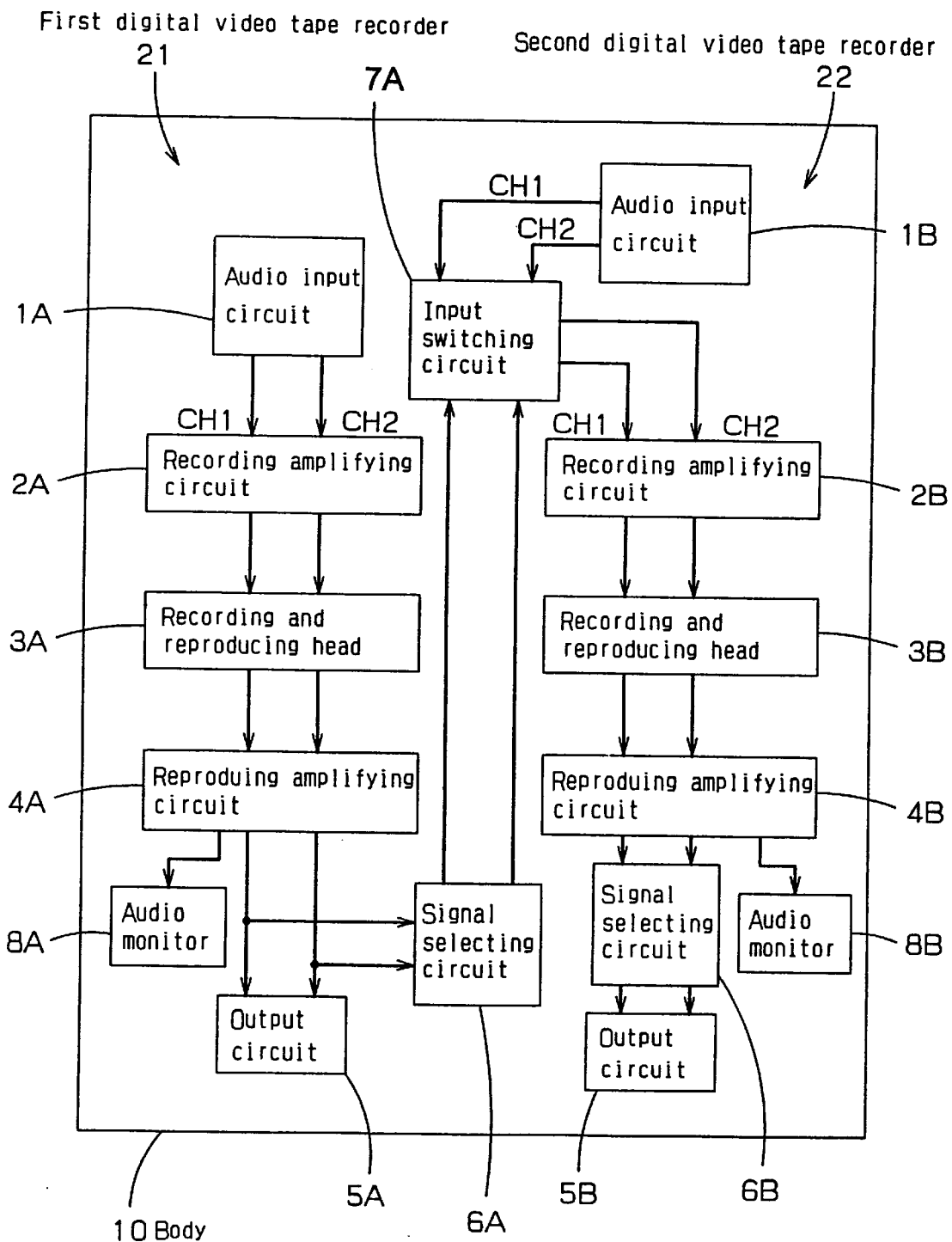
FIG. 1 is a block diagram illustrating a configuration of a video recording and reproducing device of the present invention.
Figure 2:
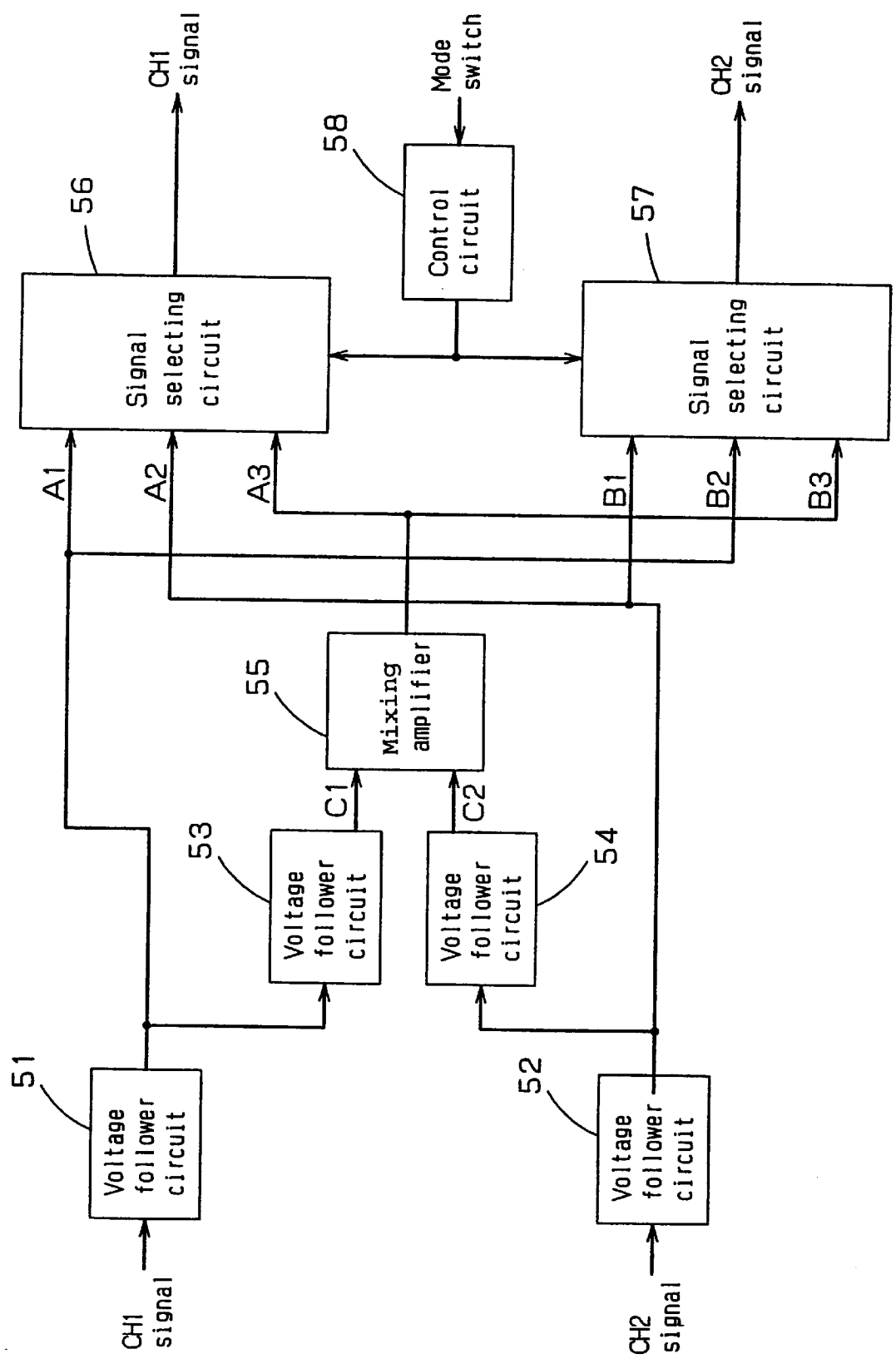
FIG. 2 is a block diagram illustrating a concrete configuration of the signal selecting circuit of FIG. 1.

FIG. 1 is a block diagram of a video recording and reproducing device of an example of the present invention, and FIG. 2 is a block diagram of a concrete configuration of a signal selecting circuit.

As shown in FIG. 1, the video recording and reproducing device comprises a body 10 where first and second digital video tape recorders 21, 22 capable of recording two channel audio signals outputted from the outside, an editorial means (not illustrated) for editorial operation between the first and second digital video tape recorders 21, 22, first and second video monitors (not illustrated) for indicating video outputs from the first and second digital video tape recorders 21, 22, arranged in the same direction provided integrally with the body 10, and first and second audio monitors 8A, 8B for reproducing audio outputs from the first and second video tape recorders 21, 22, are provided.

The first digital video tape recorder 21 comprises a first audio input circuit 1A for inputting two channel audio signals from the outside, a first recording amplifying circuit 2A for amplifying two channel audio signals (CH1 signals, CH2 signals) outputted from the first audio input circuit 1A, a first recording and reproducing head 3A for recording outputs from the first recording amplifying circuit 2A in a first digital cassette tape (not illustrated), which serves as a recording medium and reproducing two channel audio signals recorded in the first digital cassette tape, a first reproducing amplifying circuit 4A for amplifying the two channel audio signals reproduced by the first recording and amplifying head 3A, and a first output circuit 5A for outputting the two channel audio signals outputted from the first reproducing amplifying circuit 4A to the outside. Since the configuration of the portion of recording and reproducing video signals in the first digital video tape recorder 21 is the same as an ordinary digital video tape recorder, a further explanation is not provided.

The second digital video tape recorder 22 comprises a second audio input circuit 1B for inputting two channel audio signals from the outside, a second recording amplifying circuit 2B for amplifying two channel audio signals outputted from the second audio input circuit 1B, a second recording and reproducing head 3B for recording outputs from the second recording amplifying circuit 2B in a second digital cassette tape (not illustrated), which serves as a recording medium and reproducing two channel audio signals recorded in the second digital cassette tape, a second reproducing amplifying circuit 4A for amplifying the two channel audio signals reproduced by the second recording and amplifying head 3B, and a second output circuit 5B for outputting the two channel audio signals outputted from the second reproducing amplifying circuit 4B to the outside. Since the configuration of the portion of recording and reproducing video signals in the second digital video tape recorder 22 is the same as an ordinary digital video tape recorder, a further explanation is not provided.

And the video recording and reproducing device comprises a first signal selecting circuit 6A for selecting either of a first state where the two channel audio signals reproduced by the first digital video tape recorder 21 are outputted from the same channels, a second state where the reproduced two channel audio signals are outputted from the opposite channels after channel switching, and a third state where the reproduced two channel audio signals are mixed to output the same signals from the both channels, an input switching circuit 7A for supplying output signals from the first signal selecting circuit 6A to the second digital video tape recorder 22 in place of two channel audio signals from the outside, and a second signal selecting circuit 6B for selecting either of a first state where the two channel audio signals reproduced by the second digital video tape recorder 22 are outputted from the same channels, a second state where the reproduced two channel audio signals are outputted from the opposite channels after channel switching, and a third state where the reproduced two channel audio signals are mixed to output the same signals from both channels.

The first signal selecting circuit 6A, which is provided at the output end of the first reproducing amplifying circuit 4A, selects either of a first state where the two channel audio signals outputted from the first reproducing amplifying circuit 4A are outputted from the same channels, a second state where the two channel audio signals outputted from the first reproducing amplifying circuit 4A are outputted from the opposite channels after channel switching, and a third state where the two channel audio signals outputted from the first reproducing amplifying circuit 4A are mixed to output the same signals from both channels.

The input switching circuit 7, which is provided between the first signal selecting circuit 6A and the second audio input circuit 1B, and the second recording amplifying circuit 2B, supplies output signals from the first signal selecting circuit 6A to the second recording amplifying circuit 2B in place of two channel audio signals outputted from the second audio input circuit 1B.

The second signal selecting circuit 6B, which is provided between the second reproducing amplifying circuit 4B and the second output circuit 5B, selects either of a first state where the two channel audio signals outputted from the second reproducing amplifying circuit 4B are supplied to the second output circuit 5B on the same channels, a second state where the two channel audio signals outputted from the second reproducing amplifying circuit 4B are supplied to the second output circuit 5B on the opposite channels after channel switching, and a third state where the two channel audio signals outputted from the second reproducing amplifying circuit 4B are mixed and supplied to the second output circuit 5B as the same signals on both channels.

Recording, reproduction and editorial operations in a video recording and reproducing device with the above mentioned configurations will be explained. In the video recording and reproducing device, two channel audio signals of a first system (CH1 signal, CH2 signal) inputted from the outside are received through a first audio input circuit 1A and recorded in a digital cassette tape by a first recording amplifying circuit 2A and a first recording and reproducing head 3A. The two channel audio signals recorded in the digital cassette tape are reproduced by the first recording and reproducing head 3A and a first reproducing amplifying circuit 4A to be outputted to the outside through a first output circuit 5A. At the time, either of the two channel audio signals is selectively outputted to a first audio monitor 8A.

Further, the two channel audio signals outputted from the first reproducing amplifying circuit 4A are supplied also to a first signal selecting circuit 6A, and by selecting the state of the first signal selecting circuit 6A, the two channel audio signals reproduced by the first reproducing amplifying circuit 4A can be supplied to a input switching circuit 7 on the same channels, the two channel audio signals reproduced by the first reproducing amplifying circuit 4A can be supplied to the input switching circuit 7 on the opposite channels after channel switching, or the two channel audio signals reproduced by the first reproducing amplifying circuit 4A can be mixed and supplied to the input switching circuit 7 as the same signals.

In the case the input switching circuit 7 is switched to the state where two channel audio signals outputted from the second audio input circuit 1B are supplied to the second recording amplifying circuit 2B, two channel audio signals of a second system (CH1 signal, CH2 signal) inputted from the outside are received through a second audio input circuit 1B and recorded in a digital cassette tape by a second recording amplifying circuit 2B and a second recording and reproducing head 3B. The two channel audio signals recorded in the digital cassette tape are reproduced by the second recording and reproducing head 3B and a second reproducing amplifying circuit 4B to be outputted to the outside through a second signals selecting circuit 6B and a second output circuit 5B. By selecting the state of the second signal selecting circuit 6B, the two channel audio signals reproduced by the second reproducing amplifying circuit 4B can be outputted to the outside through a second output circuit 5B on the same channels, the two channel audio signals reproduced by the second reproducing amplifying circuit 4B can be outputted to the outside through the second output circuit 5B on the opposite channels after channel switching, or the two channel audio signals reproduced by the second reproducing amplifying circuit 4B can be mixed and outputted to the outside through the second output circuit 5B as the same signals. At the time, either of the two channel audio signals is selectively outputted to a second audio monitor 8B.

In the case the input switching circuit 7 is switched to the state where two channel audio signals outputted from the first audio input circuit 6A are supplied to the second recording amplifying circuit 2B, by selecting the state of the first signal selecting circuit 6A, the two channel audio signals reproduced by the first reproducing amplifying circuit 4A can be recordedby the second recording amplifying circuit 2B and the recording and reproducing head 3B on the same channels, the two channel audio signals reproduced by the first reproducing amplifying circuit 4A can be recorded by the second recording amplifying circuit 2B and the recording and reproducing head 3B on the opposite channels after channel switching, or the two channel audio signals reproduced by the first reproducing amplifying circuit 4A can be mixed and recorded by the second recording amplifying circuit 2B and the recording and reproducing head 3B as the same signals.

Since connection with an outside video monitor or an outside audio monitor is not necessary in the editorial operation such as channel switching and mixing of the first channel audio signals and the second channel audio signals, editing can be conducted easily. Further, since the first and second video monitors and the first and second audio monitors 8A, 8B are provided, editorial operation with channel switching or inter-channel mixing of audio signals can be conducted after shooting at the location site without returning to the studio, and thus the video and audio signals can be provided for broadcast rapidly.

A concrete configuration of the first signal selecting circuit 6A will be explained with reference to FIG. 2. A configuration of the second signal selecting circuit 6B is the same as that of the first signal selecting circuit 6A.

As shown in FIG. 2, a first channel audio signal (CH1 signal) and a second channel audio signal (CH2 signal) of the first digital video tape recorder 21 are respectively inputted to voltage follower circuits 51, 52 for impedance conversion. The output from the voltage follower circuit 51 is provided to an input terminal A1 of a three-input-one-output type signal selecting circuit 56 as well as to an input terminal B2 of a three-input-one-output type signal selecting circuit 57. The output from the voltage follower circuit 52 is provided to an input terminal A2 of the signals selecting circuit 56 as well as to an input terminal B1 of the signal selecting circuit 57.

Furthermore, the output from the voltage follower circuit 51 is provided to an input terminal C1 of a mix amplifier 55 via a voltage follower circuit 53 for impedance conversion, and the output from the voltage follower circuit is provided to an input terminal C2 of the mix amplifier 55 via a voltage follower circuit 54 for impedance conversion. In the process, the CH1 signal and the CH2 signal of the first digital video tape recorder 21 are mixed, and the output from the mix amplifier 55 is provided to an input terminal A3 of the signal selecting circuit 56 and an input terminal B3 of the signal selecting circuit 57.

The signal selecting circuit 56, 57 are switched according to a control circuit 58, which responds to a mode selector switch for switching audio output modes later described. That is, in the case the signal selecting circuit 56 outputs a signal from the input terminal A1, the signal selecting circuit 57 outputs a signal from the input terminal B1, in the case the signal selecting circuit 56 outputs a signal from the input terminal A2, the signal selecting circuit 57 outputs a signal from the input terminal B2, and in the case the signal selecting circuit 56 outputs a signal from the input terminal A3, the signal selecting circuit 57 outputs a signal from the input terminal B3. Among the above-mentioned, the first state (A1, B1 output) is the same channel output mode, the second state (A2, B2 output) is the opposite channel output mode, and the third state (A3, B3 output) is the mixed channel output mode.

Figure 3:
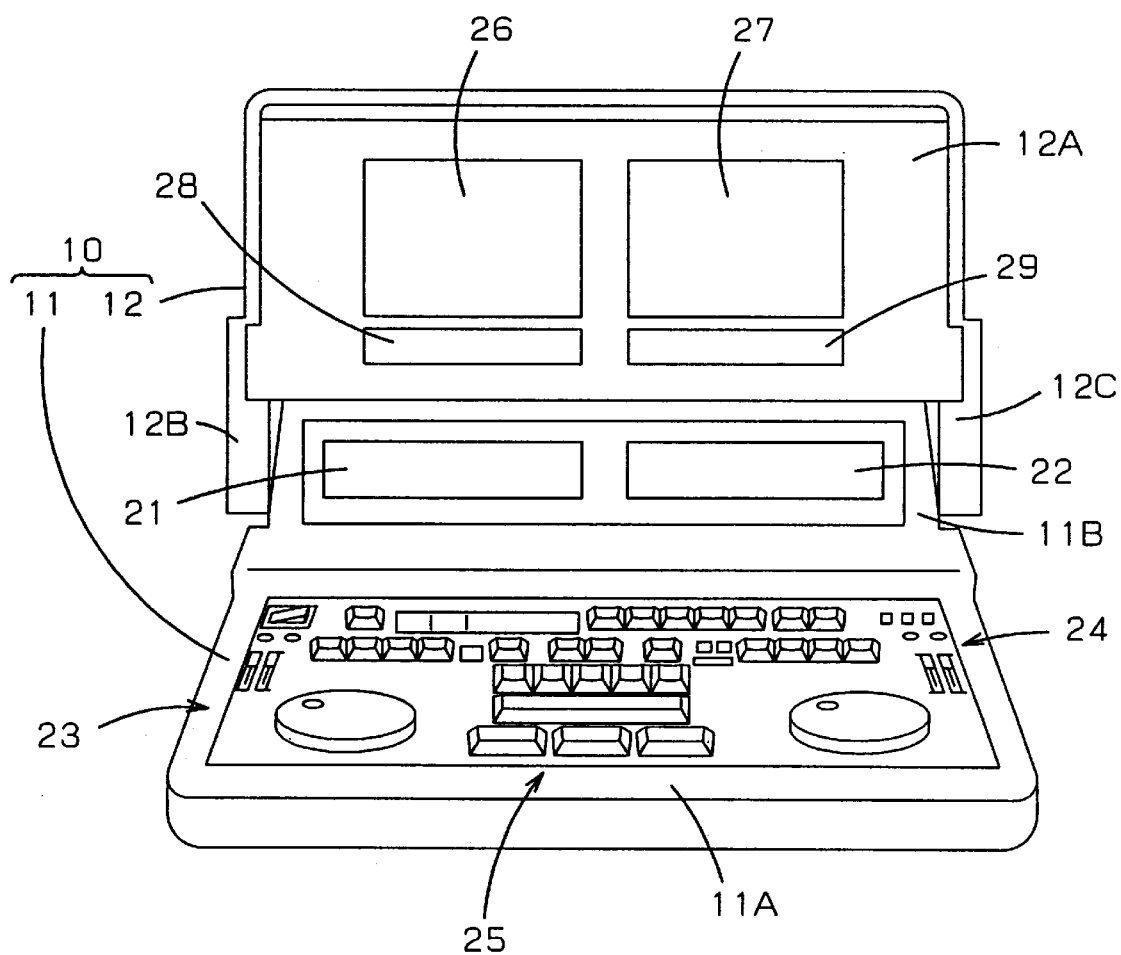
FIG. 3 is a schematic perspective view illustrating a configuration of a video recording and reproducing device of an example of the present invention.

A configuration of the video recording and reproducing device will be explained with reference to the schematic perspective view of FIG. 3. The video recording and reproducing device comprises a base portion 11 and a movable portion 12 attached to the base portion 11 capable of being upright or prone to form one lap top type body 10. The base portion 11 of the lap top type body 10 has a two-stage structure with a lower portion at the outer end 11A and a higher portion at the inner end 11B.

The above-mentioned higher portion at the inner end 11B of the base portion 11 of the lap top type body 10 comprises built-in first and second digital video tape recorders 21, 22, capable of recording and reproducing independently, arranged horizontally adjacent to each other. The loading apertures for the first and second digital video tape recorders 21, 22 are arranged horizontally in the front end face of the higher portion at the inner end 11B. The numerals 21, 22 in FIG. 3 refer to the portions of the loading apertures. In the base portion 11, a built-in editorial means (not illustrated) for editing video and audio signals between the first and second digital video tape recorders 21, 22 is provided. The upper surface of the lower portion at the outer end 11A of the base portion 11 of the body 10 comprises operating portions 23, 24 for the first and second digital video tape recorders 21, 22 arranged horizontally and adjacently similar to the position of the first and second digital video tape recorders 21, 22 and an operating portion 25 for editorial means (not illustrated) is provided between the operating portions 23, 24 in the upper portion of the lower portion at the outer end 11A.

A circuit for editorial means is designed with the premise that the first digital video tape recorder 21 on the left is used for reproducing an original digital cassette tape, the second digital video tape recorder 22 on the right is used for recording a master digital cassette tape, and the editorial means uses the first and second digital video tape recorders 21, 22 as mentioned above in editorial operation. The first and second digital video tape recorders 21, 22 have the same configuration in terms of recording and reproducing functions. Namely, video and audio signals of two system line input can be recorded independently, and video and audio signals recorded in two digital cassette tapes can be reproduced independently to be outputted in two systems as line outputs. Recording, reproducing and editorial operations are the same as the conventional device except that the first digital video tape recorder 21 is capable of both recording and reproducing.

A movable portion 12 in the body 10 comprises a pair of leg portions 12B, 12B at the both ends of a main body portion 12A. The higher portion at the inner end 11B and a pair of the leg portions 12B, 12C are hinged with the higher portion at the inner end 11B interposed between a pair of the leg portions 12B, 12C so that the movable portion 12 moves relatively to the base portion in the vertical direction. The main body portion 12A of the movable portion 12 is positioned above the higher portion at the inner end 11B of the base portion 11 in the upright state, and is superimposed on the lower portion at the outer end 11A in the prone state.

First and second video monitors 26, 27 comprising color liquid crystal panels for individually indicating reproduced video outputs from the first and second digital video tape recorders 21, 22 are provided in the surface which faces to the lower portion at the outer end 11A of the base portion in the prone state, that is, in the surface which faces to the user in the upright state, of the main body portion 12A of the movable portion 12.

A first display means 28 comprising a fluorescent character display tube for indicating editing related information such as a tape traveling state and a time code pertaining to the first digital video tape recorder 21 is provided in the vicinity of the first video monitor 26 in the main body portion 12A integrally in the direction the same as that of the first and second video monitors 26, 27. Similarly, a second display means 29 comprising a fluorescent character display tube for indicating editing related information such as a tape traveling state and a time code pertaining to the second digital video tape recorder 22 is provided in the vicinity of the second video monitor 27 in the main body portion 12A integrally in the direction the same as that of the first and second video monitors 26, 27. Although the first and second display means 28, 29 are provided below the first and second video monitors 26, 27 in FIG. 3, they can be positioned above or both sides as well.

Accordingly, the operating portions 23, 24 for the first and second digital video tape recorders 21, 22 and the operating portion 25 for the editorial means mentioned above are provided in the base portion 11 on the surface facing to the movable portion 12 in the prone state.

Figure 4:
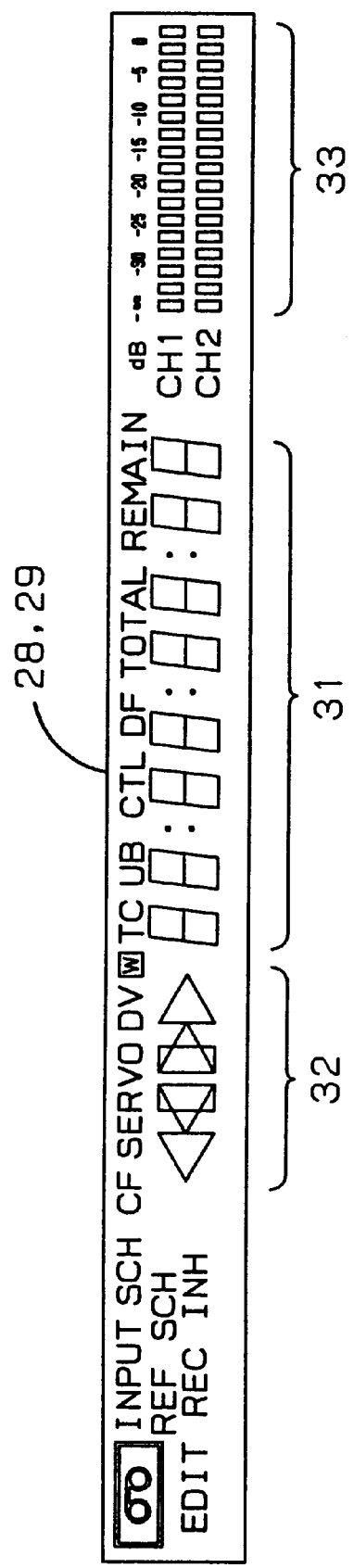
FIG. 4 is a schematic diagram illustrating a concrete example of a display means of the video recording and reproducing device of FIG. 1.

An example of a concrete display pattern of editing related information indicated in the first and second display means 28, 29 is shown in FIG. 4. Various symbols and characters are to be selectively lit for indicating the state according to the operation state of the digital video tape recorder.

The portion referred to with numeral 31 is a counter display portion with eight digits for displaying time code, etc. From the left side, hour, minute, second, frame are indicated in two digits each. Besides, other user information can be indicated with numbers and alphabets.

The portion referred to with numeral 32 shows symbols to indicate the traveling state of the digital video tape recorder with a combination of symbols (PLAY, FF, REV PLAY, REW, STILL, FWD SLOW, REV SLOW) to be lit.

The portion referred to with numeral 33 with characters (CH1, CH2, dB, -∞, -30, -25, -20, -15, -10, -5, 0) and symbols (rectangles in two lines) is an audio level meter portion for indicating the level of two channel audio signals like a bar graph.

Display contents are shown in Tables 1 to 3 later described.

Figure 5:
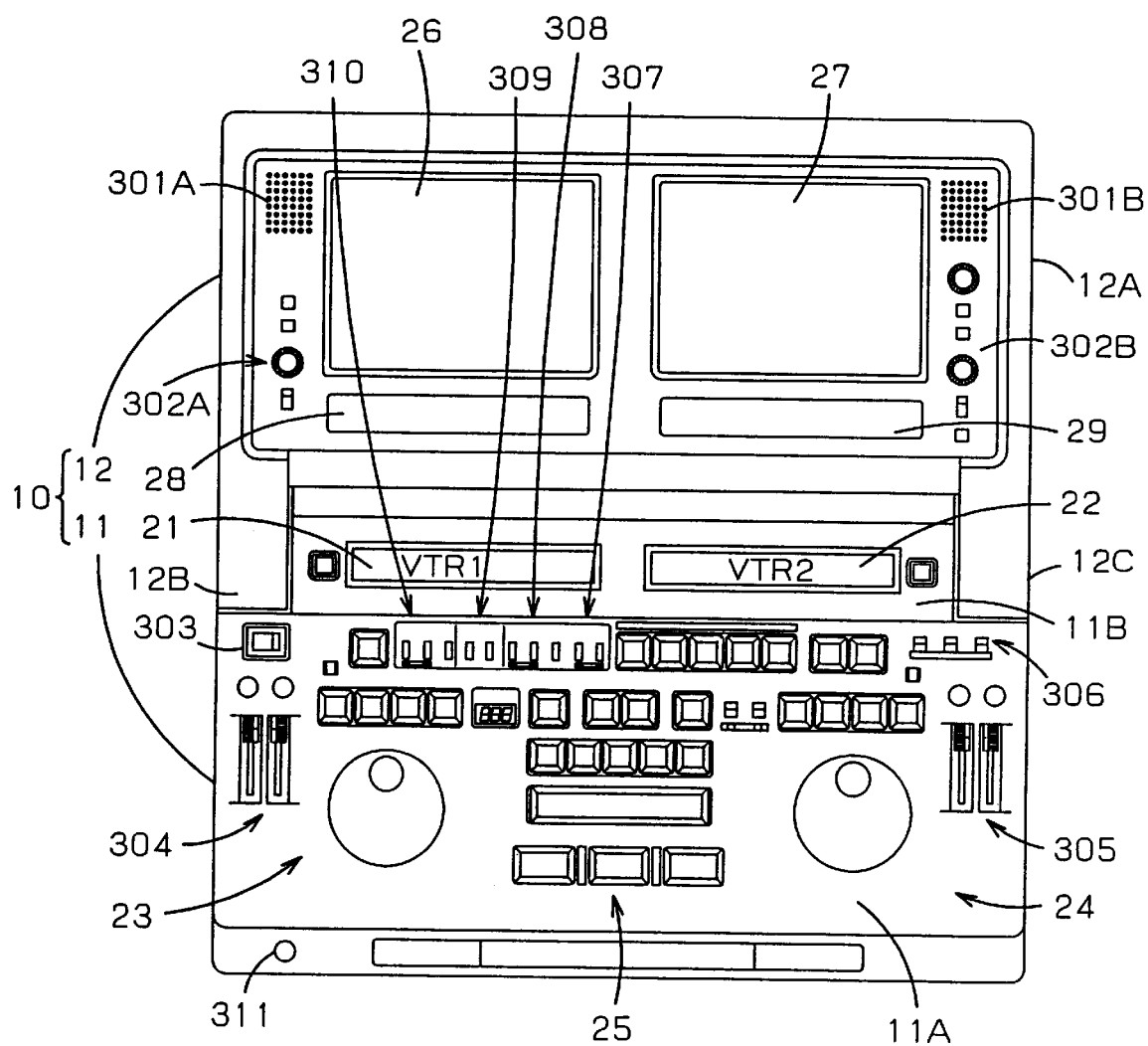
FIG. 5 is a development of a lower portion at the outer end of a base portion and a movable portion of a video recording and reproducing device of an example of the present invention.
Figure 6:
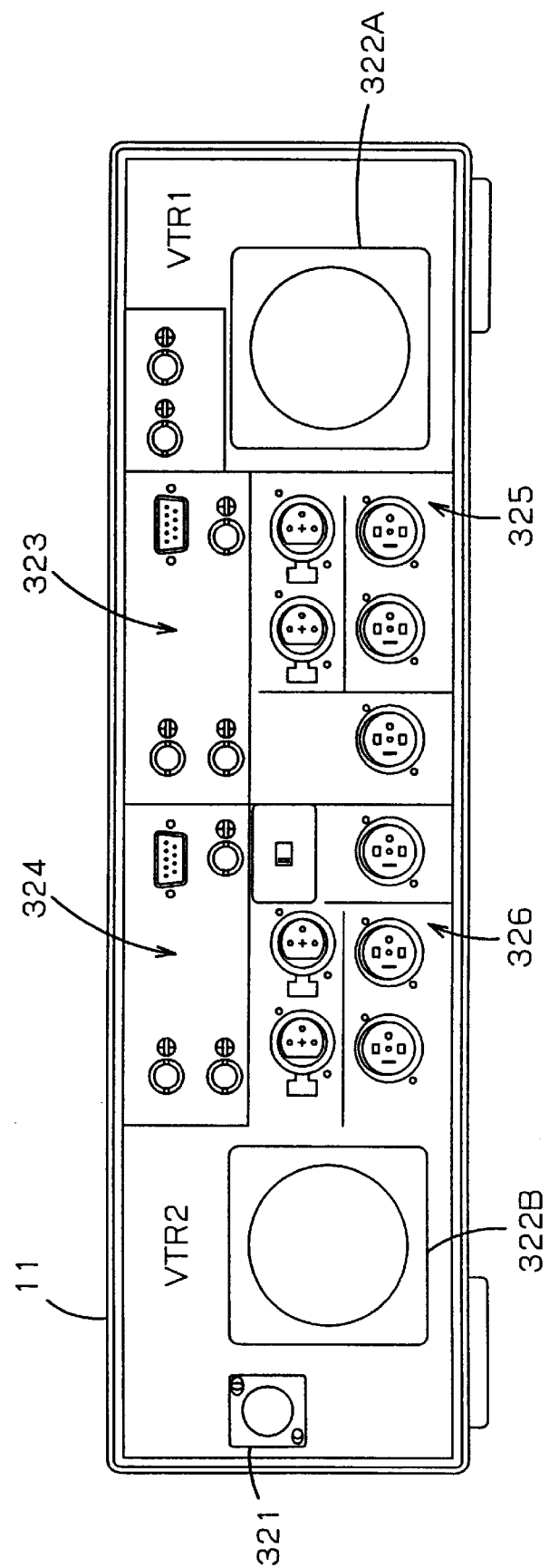
FIG. 6 is a rear view of a base portion of an example of a video recording and reproducing device of the present invention.
Figure 7:
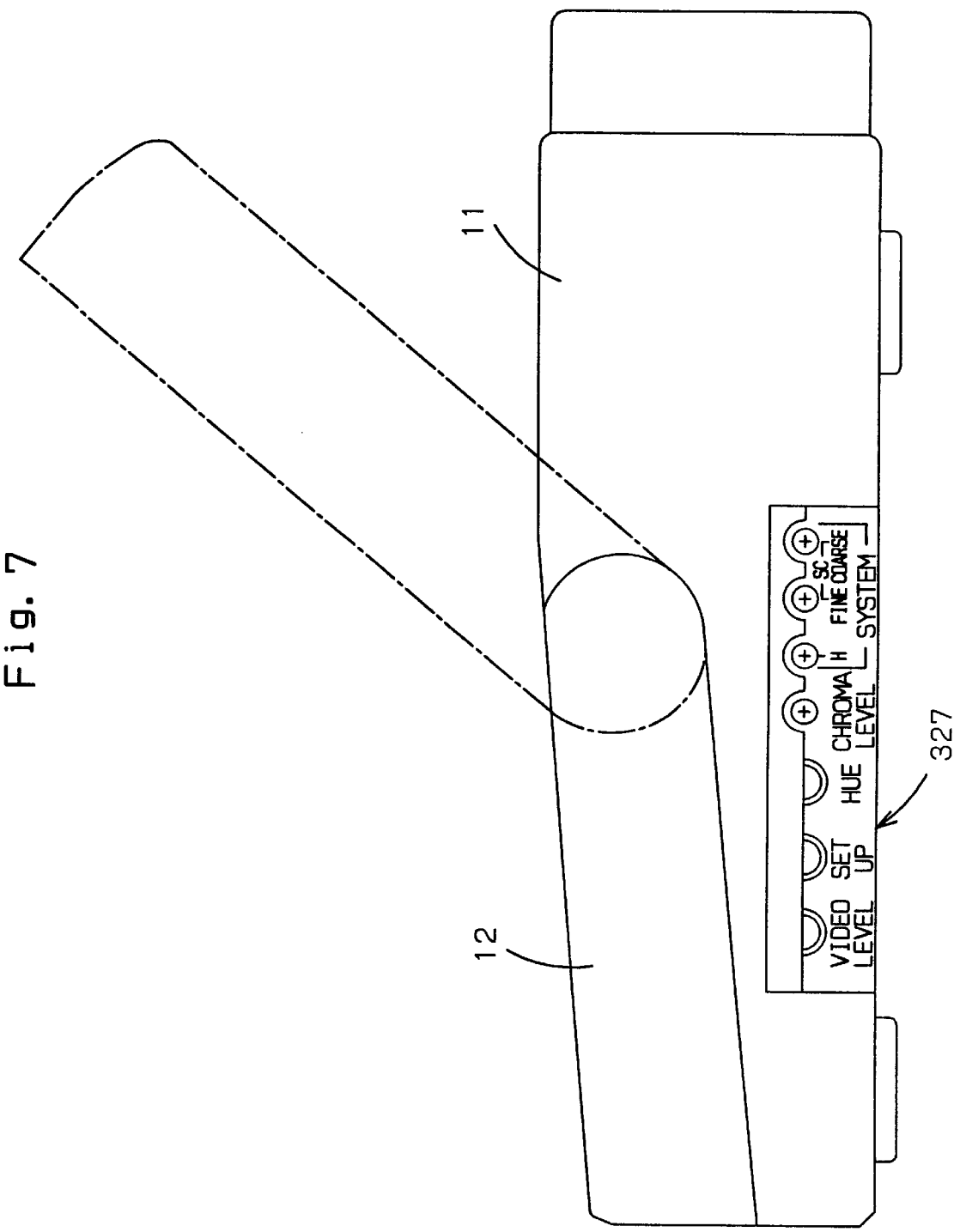
FIG. 7 is a side view of a base portion of an example of a video recording and reproducing device of the present invention.
Figure 8:
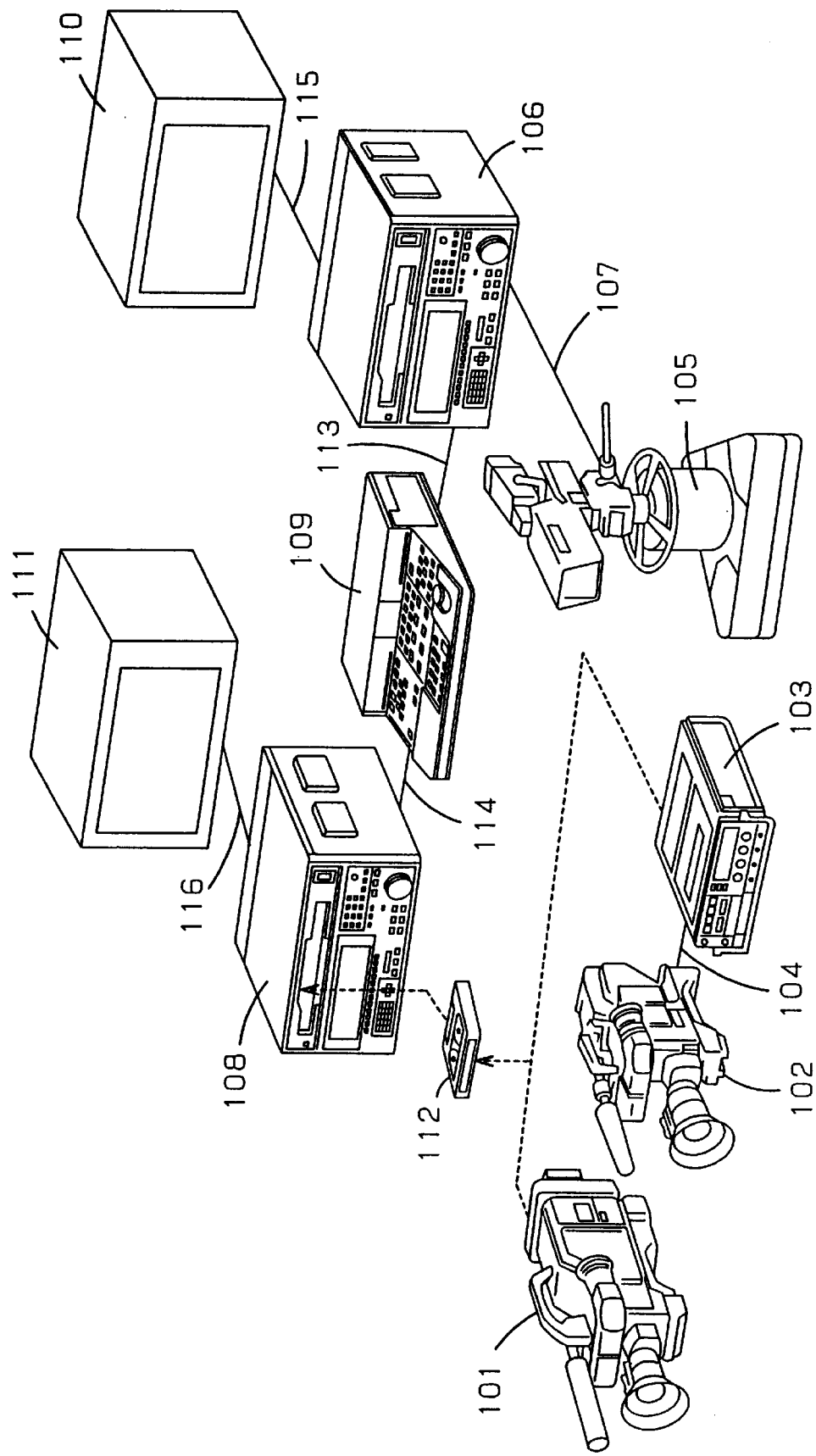
FIG. 8 is a schematic diagram of a conventional video shooting and editing system.
Figure 9:
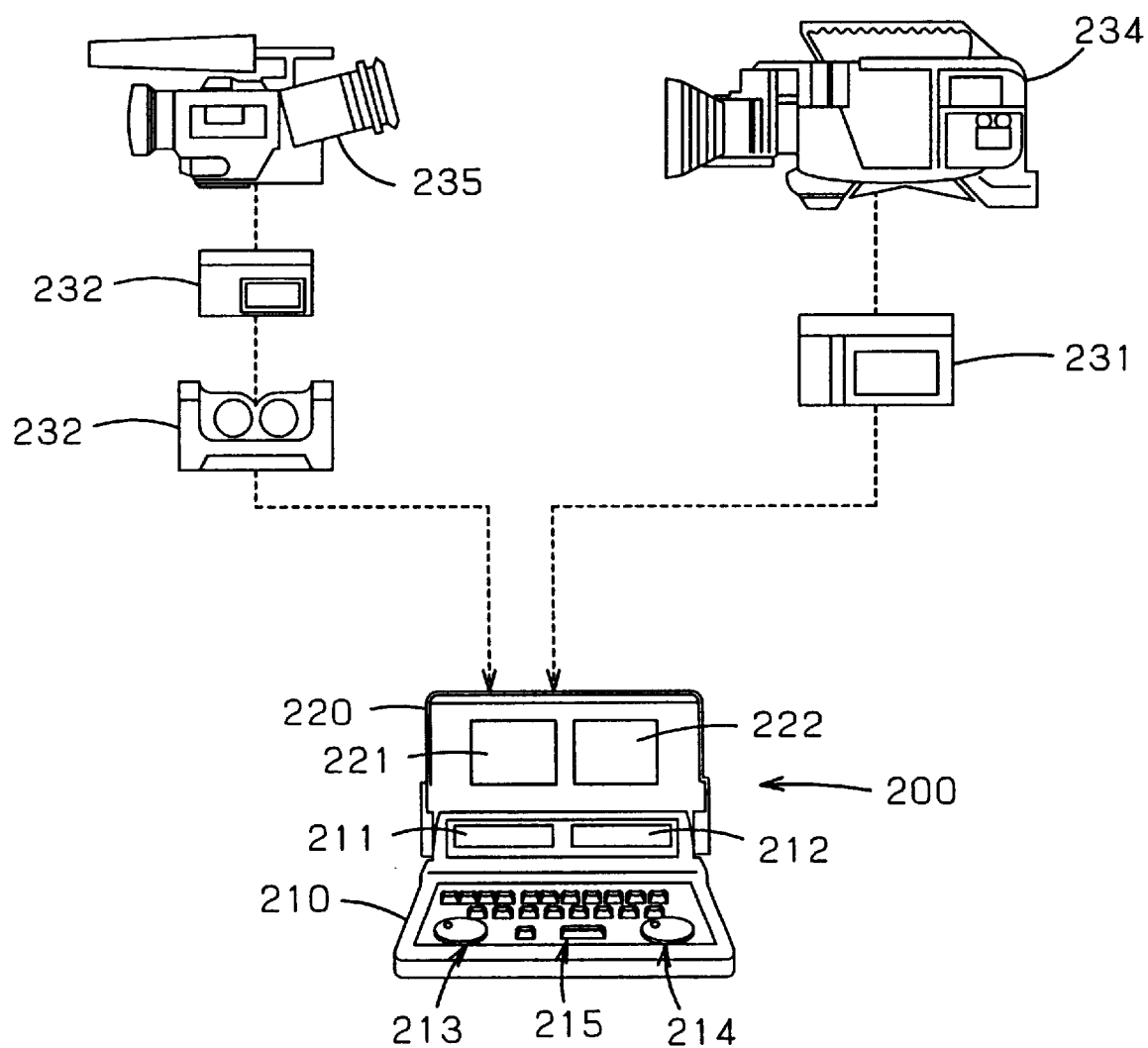
FIG. 9 is a schematic diagram illustrating the state of video editing using a lap top type video recording and reproducing device, which has been proposed already.

FIG. 5 is a development of the surface of a lower portion at the outer end 11A of a base portion 11 and a movable portion 12 of the video recording and reproducing device of FIG. 1. FIG. 6 is a rear view of the base portion of the video recording and reproducing device. FIG. 7 is a side view of the video recording and reproducing device, where the chain line denotes the movable portion in the upright state. Hereinafter positions of the operating portions and input and output terminals in the video recording and reproducing device shown in FIG. 3 are explained with reference to FIGS. 5, 6 and 7.

In FIG. 5, portions referred to with the numerals 301A, 301B comprise audio output holes for two speakers for audio monitoring built in the main body portion 12A of the movable portion 12. The portion referred to with the numeral 302A comprises a COUNTER/REMAIN switching button for switching the counter display for the digital video tape recorder 21, an EXT CHECK button, a BRIGHTNESS control for brightness control, and a display mode selector switch for switching high intensity level display mode, low intensity level display mode, and off mode of the video monitor 26. The portion referred to with the numeral 302B comprises a volume control of the built-in speaker, a COUNTER/REMAIN switching button for switching the counter display for the digital video tape recorder 22, an EXT CHECK button, a BRIGHTNESS control for brightness control, a display mode selector switch for switching high intensity level display mode, low intensity level display mode, and off mode of the video monitor 26, and a button for switching the counter to total display.

The numeral 303 denotes the operating portion of the power source switch. The portion referred to with the numeral 304 comprises level adjusting levers for reproducing audio two channels of the digital video tape recorder 21, and level adjusting controls for recording audio two channels to the inner side. The portion referred to with the numeral 305 comprises level adjusting levers for reproducing audio two channels of the digital video tape recorder 22, and level adjusting controls for recording audio two channels to the inner side.

The portion referred to with the numeral 306 comprises three input selector switch operating portions for video signals and two channel audio signals of the digital video tape recorder 22, wherein a video signal (V) selector switch on the left, a first channel audio signal (A1) selector switch in the center, and a second channel audio signal (A2) selector switch on the right can be optionally switched independently, and thus either of a reproduced signal from the digital video tape recorder 21 and a input signal from the outside can be selected. For example, a video signal and an audio signal from the digital video tape recorder 21 for the first channel and an audio signal from the outside for the second channel can be selected so that narration can be inserted afterwards. Further, it is also possible that a video signal from the digital video tape recorder 21 and two channel audio signals from the outside can be selected. Accordingly, reproduced outputs from the digital video tape recorder 21 and inputs from the outside can be selected optionally.

The portion referred to with the numeral 307 comprises a mode selector switch operating portion (left) for switching the audio output mode in recording two channel audio signals reproduced by the digital video tape recorder 21 with the digital video tape recorder 22 and a mode selector switch operating portion (right) for switching the audio output mode for two channel audio signals reproduced by the digital video tape recorder 22 for editing.

These mode selector switches are for selecting three kinds of output modes, that is, the same channel mode, the opposite channel mode, and the mix channel mode. In the same channel mode, a first channel audio signal is outputted from the first channel and a second channel audio signal is outputted from the second channel. In the opposite channel mode, a first channel audio signal is outputted from the second channel and a second channel audio signal is outputted from the first channel. In the mix channel mode, a first channel audio signal and a second channel audio signal are synthesized with a device such as a voltage follower circuit, a mix amplifier, and a selector switch means so that the same signal is outputted from the first and second channels.

For example, even in the case the first and second channel audio signals were inadvertently recorded in the opposite sides in recording the original video and audio signals, with the opposite channel mode, the two channel audio signals can be rearranged in the intended channels in the editorial operation. Furthermore, with the mix channel mode, original two channel audio signals can be integrated in one channel so that a one channel audio signal can be supplied to broadcast equipment having only one channel.

The portion referred to with the numeral 308 comprises operating portions for three mode selector switches for audio monitoring. The first mode selector switch on the left is for selecting the monitoring mode of the audio signals reproduced with the digital video tape recorder 21 and switches among the first channel output mode, the mix mode and the second channel output mode. The second mode selector switch in the center is for selecting the monitoring mode of the audio signals reproduced with the digital video tape recorder 22 and switches among the first channel output mode, the mix mode and the second channel output mode. The third mode selector switch on the right is for selecting the audio outputs from built-in speakers or to a headphone and switches among the mode where audio outputs from the digital video tape recorder 21 are outputted from both the built-in speakers or from both the headphone speakers, the mode where the audio outputs from the digital video tape recorder 21 are outputted from either one of the built-in speakers or from either one of the headphone speakers and the audio outputs from the digital video tape recorder 22 are outputted from the other built-in speaker or the other headphone speaker, and the mode where the audio outputs from the digital video tape recorder 22 are outputted from both the built-in speakers or from both the headphone speakers.

The portion referred to with the numeral 309 comprises operating portions for two selector switches for editorial operation. That is, the left selector switch is for setting the pre-roll time at either of 7 seconds, 5 seconds or 3 seconds, and the right selector switch is for switching the synchronous mode among the CF mode, ON and OFF.

The portion referred to with the numeral 310 comprises operating portions for three selector switches. The left selector switch is for selecting on and off of recording inhibition for the digital video tape recorder 21 (REC INIHBIT). The center selector switch is for selecting on and off of recording (images or sounds) inhibition for the digital video tape recorder 22 (REC INHIBIT). And the right selector switch is for selecting between the remote control and the local control. The numeral 311 denotes a headphone terminal.

The operating portion referred to with the numeral 23 comprises a PLAY/STOP key, a STILL/STBOFF key, a REW key, an FF key, a REC key, a RESET key, a jog shuttle and an event number indicator.

The operating portion referred to with the numeral 24 comprises a PLAY/STOP key, a STILL/STBOFF key, a REW key, an FF key, a REC/STORE key, an EDIT/MENU key, a RESET key, a jog shuttle and an event number indicator.

The operating portion referred to with the numeral 25 comprises an ASSEM key, a V key, an A1 key, an A2 key, a TC key, an AUDIO SPUT/1ST EDIT key, a -/RS key, a +/ES key, a LAST EDIT/CLEAR key, an IN key, an OUT key, a GO TO key, an IN key, an OUT key, an ENTRY/SHIFT key, a PREVIEW/REVIEW key, an AUTO EDIT/MULTI key, an ALL STOP key, and two switches for switching counter display for setting editorial mode. The switch on the right selects among the CTL display mode, the TC display mode and the UB display mode for the digital video tape recorder 21. The switch on the left switches among the CTL display mode, the TC display mode and the UB display mode for the digital video tape recorder 22.

In FIG. 6, the numeral 321 denotes a 12 V direct current power source input terminal, and the numerals 322A, 322B denote air-cooling fans. The portion referred to with the numeral 323 comprises the video input terminal, the video output terminal, the video monitor output terminal and the remote terminal for the digital video tape recorder 21. The portion referred to with the numeral 324 comprises the video input terminal, the video output terminal, the video monitor output terminal and the remote terminal for the digital video tape recorder 22. The portion referred to with the numeral 325 comprises audio input terminals (LINE) and audio output terminals for the first and second channels and an audio monitor output terminal of the digital video tape recorder 21. The portion referred to with the numeral 326 comprises a first channel audio input terminal (LINE), an audio input terminal (LINE/MIC) and an audio output terminal for the operating portion of the LINE/MIC selector switch for the second channel of the digital video tape recorder 22.

In FIG. 7, the portion referred to with the numeral 327 comprises a video level control, a set up control, a hue control, a chroma level adjusting portion, and a system adjusting portion (horizontal frequency, subcarrier frequency fine control and coarse control).

The above-mentioned first video tape recorder 21 may be one dedicated for reproduction.

TABLE 1

| Indication | Meaning in the lit state |
|---|---|
| ▷ | PLAY |
| ▷▷ | FF |
| ◁ | REV PLAY |
| ◁◁ | REW |

TABLE 1-continued

| Indication | Meaning in the lit state |
|---|---|
| ‖ | STILL |
| ‖▷ | FWD SLOW |
| ◁‖ | REV SLOW |

TABLE 2

| Indication | Meaning in the lit state |
|---|---|
| INPUT | Video input exists, |
| INPUT SCH | video input SCH OK |
| REF | REF input exists, |
| REF SCH | REF SCH OK |
| REC | Recording mode |
| REC INH | Recording inhibition |
| EDIT REC | Editorial recording |
| CF | Color framing OK |
| SERVO | Servo lock OK |
| DV | DV format |
| [⊙⊙] | Cassette mounted |
| [W] | Wide |

TABLE 3

| Indication | Meaning in the lit state |
|---|---|
| TC | Counter displays a time code |
| UB | Counter displays a user bit |
| CTL | Counter displays a CTL count |
| DF | Time code displays a drop frame |
| TOTAL | Counter displays a total time from starting a program formation |
| REMAIN | Counter displays the time available in the remained tape |

What is claimed is:

1. A video recording and reproducing device comprising:

(a) a sinqle housing, (b) audio two channel type first and second video tape recorders, disposed in said housing, for recording two channel audio signals inputted from an external source, (c) editorial means, disposed in said housing, for performing mutual editing between the first and second video tape recorders, (d) a first signal selecting circuit, disposed in said housing, for selecting one of (i) a first state where the two channel audio signals reproduced by the first video tape recorder are outputted in a same channel mode as input from the external source, (ii) a second state where the reproduced two channel audio signals are outputted in an opposite channel mode as input from the external source after channel switching, and (iii) a third state where the reproduced two channel audio signals are mixed so as to output identical signals in each one of the two channels, and (e) an input switching circuit, disposed in said housing, for supplying output signals from the first video tape recorder as selected by the first signal selecting circuit to the second video tape recorder in place of the two channel audio input signals inputted from the external source, whereby elements (a)–(e) constitute a single portable body capable of being hand-carried by a user.

2. The video recording and reproducing device according to claim 1, further comprising:

a second signal selecting circuit, disposed in said housing, for selecting one of (i) a first state where the two channel audio signals reproduced by the second video tape recorder are outputted in a same channel mode, (ii) a second state where the reproduced two channel audio signals are outputted in an opposite channel mode after channel switching, and (iii) a third state where the reproduced two channel audio signals are mixed so as to output the identical signals in each one of the two channels.

3. The video recording and reproducing device according to claim 2, further comprising first and second video monitors, disposed in said housing, for indicating video outputs from the first and second video tape recorders individually, said first and second video monitors being arranged in the same direction, and first and second audio monitors, disposed in said housing, for reproducing audio outputs from the first and second video tape recorders.

4. The video recording and reproducing device according to claim 1, further comprising first and second video monitors, disposed in said housing, for indicating video outputs from the first and second video tape recorders individually, said first and second video monitors being arranged in the same direction, and first and second audio monitors, disposed in said housing, for reproducing audio outputs from the first and second video tape recorders.

5. A video recording and reproducing device comprising:

(a) a single housing, (b) audio two channel type first and second video tape recorders, disposed in said housing, for recording two channel audio signals inputted from an external source, (c) editorial means, disposed in said housing, for performing mutual editing between the first and second tape recorders, the first video tape recorder comprising (i) a first audio input circuit for inputting two channel audio signals from the external source, (ii) a first recording amplifying circuit for amplifying the two channel audio signals outputted from the first audio input circuit, (iii) a first recording and reproducing head for recording an output from the first recording amplifying circuit on a first recording medium and reproducing the two channel audio signals output from said first audio input circuit and recorded on the first recording medium, (iv) a first reproducing amplifying circuit for amplifying the two channel audio signals reproduced by the first recording and reproducing head, and (v) a first output circuit for outputting the two channel audio signals reproduced by the first reproducing amplifying circuit to the outside, the second video tape recorder comprising (i) a second audio input circuit for inputting two channel audio signals from the external source, (ii) a second recording amplifying circuit for amplifying the two channel audio signals outputted from the second audio input circuit, (iii) a second recording and reproducing head for recording the output from the second recording amplifying circuit on a second recording medium and reproducing the two channel audio signals output from the second audio input circuit and recorded on the second recording medium, (iv) a second reproducing amplifying circuit for amplifying the two channel audio signals reproduced by the second recording and reproducing head, and (v) a second output circuit for outputting the two channel audio signals reproduced by the second reproducing amplifying circuit to the outside, and (d) a first signal selecting circuit, disposed in said housing, for selecting one of (i) a first state where the two channel audio signals outputted from the first reproducing amplifying circuit are outputted in a same channel mode as input thereto, (ii) a second state where the two channel audio signals outputted from the first reproducing amplifying circuit are outputted in an opposite channel mode after channel switching, and (iii) a third state where the two channel audio signals outputted from the first reproducing amplifying circuit are mixed so as to output identical signals in each one of the two channels, and (e) an input switching circuit, disposed in said housing, for supplying output signals from the first video recorder as selected by the first signal selecting circuit to the second recording amplifying circuit in place of the two channel audio signals outputted from the second audio input circuit, whereby elements (a)–(e) constitute a single portable body capable of being hand-carried by a user.

6. The video recording and reproducing device according to claim 5, further comprising a second signal selecting circuit, disposed in said housing, for selecting one of (i) a first state where the two channel audio signals outputted from the second reproducing amplifying circuit are supplied to the second output circuit in a same channel mode as input thereto, (ii) a second state where the two channel audio signals outputted from the second reproducing amplifying circuit are supplied to the second output circuit in an opposite channel mode after channel switching, and (iii) a third state where the two channel audio signals outputted from the second reproducing amplifying circuit are mixed and supplied to the second output circuit in each one of the two channels as identical signals, said second signal selecting circuit being provided between the second reproducing amplifying circuit and the second output circuit.

7. The video recording and reproducing device according to claim 6, further comprising first and second video monitors, disposed in said housing, for indicating video outputs from the first and second video tape recorders individually, said first and second video monitors being arranged in the same direction, and first and second audio monitors, disposed in said housing, for reproducing audio outputs from the first and second video tape recorders.

8. The video recording and reproducing device according to claim 5, further comprising first and second video monitors, disposed in said housing, for indicating video outputs from the first and second video tape recorders individually, said first and second video monitors being arranged in the same direction, and first and second audio monitors, disposed in said housing, for reproducing audio outputs from the first and second video tape recorders.

* * * * *